July 28, 1964 W. W. WALKER 3,142,747
ELECTRIC ARC WELDING
Filed April 17, 1961 2 Sheets-Sheet 1
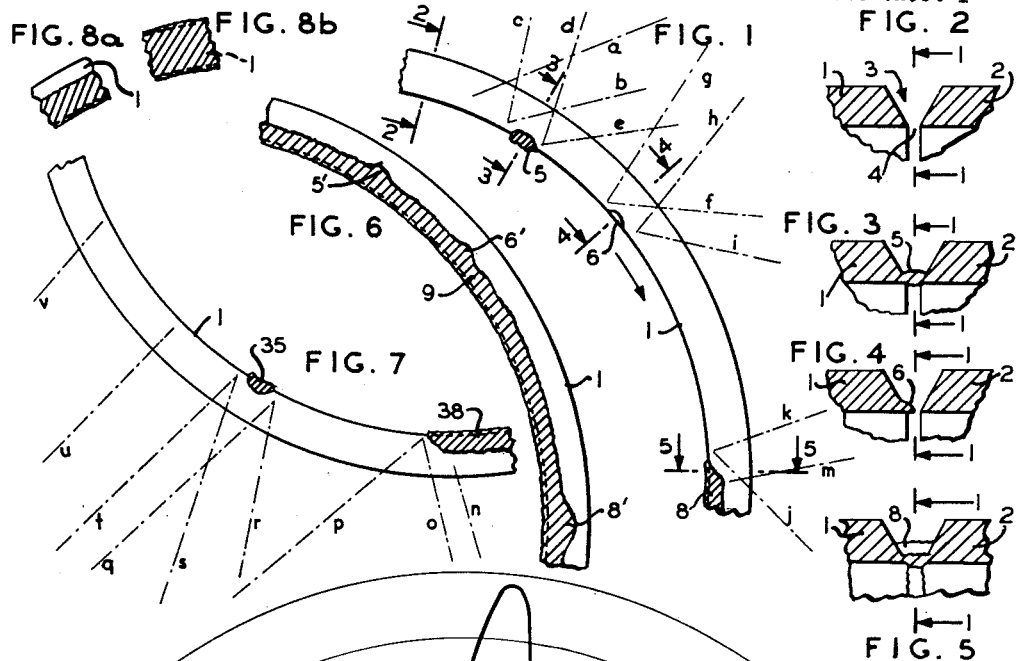
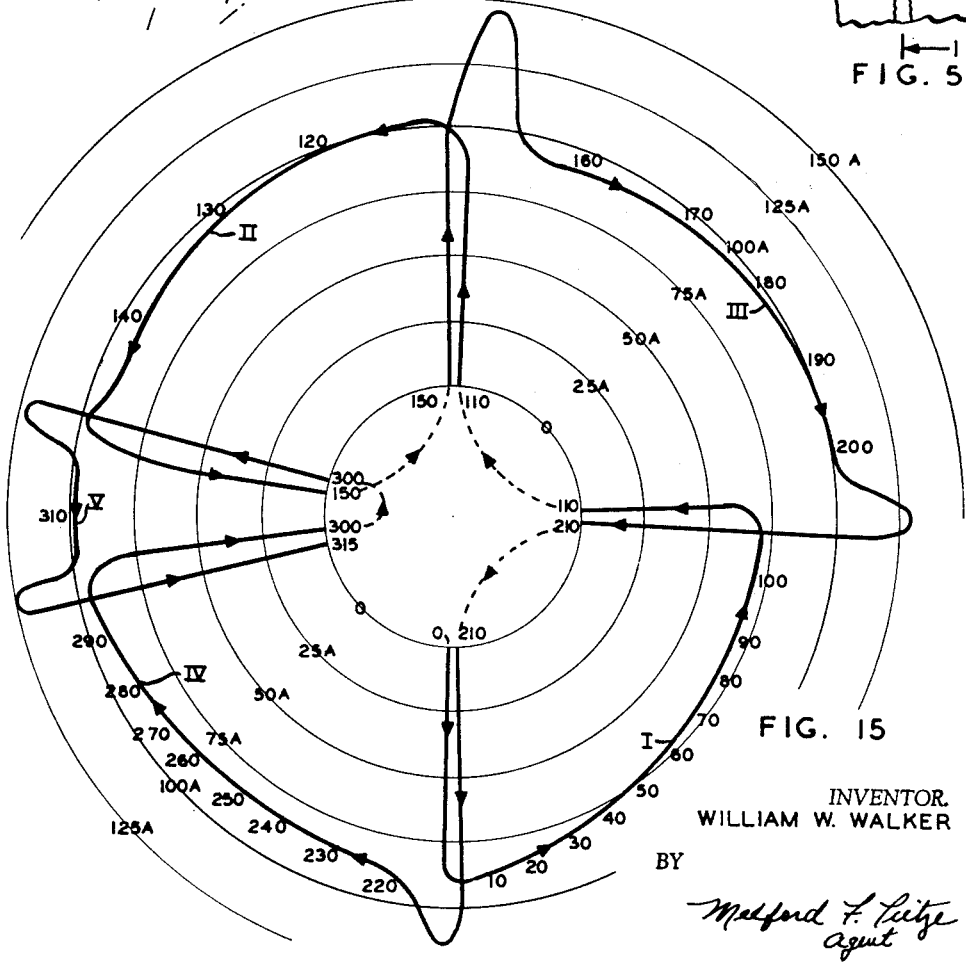
INVENTOR.
WILLIAM W. WALKER
BY
*Melford F. Pietje*
Agent

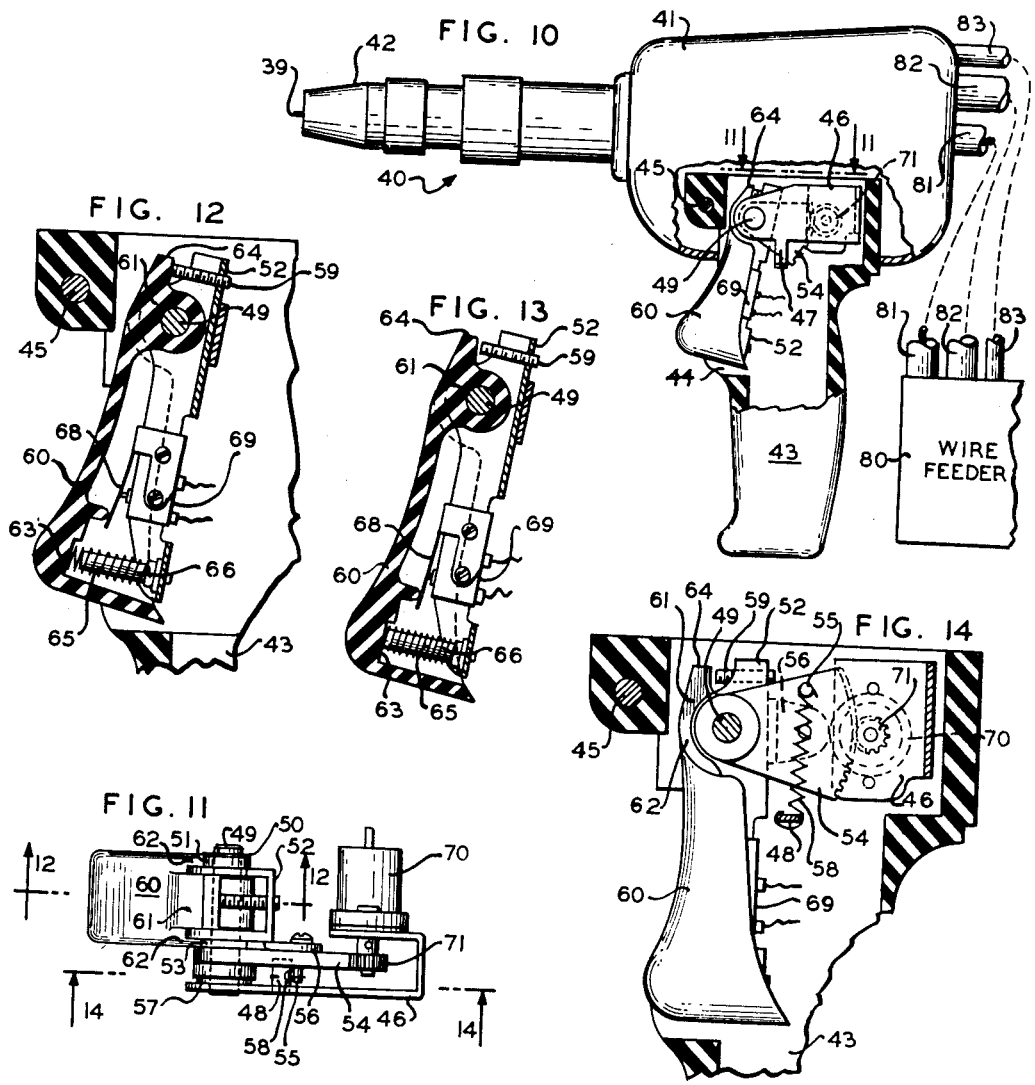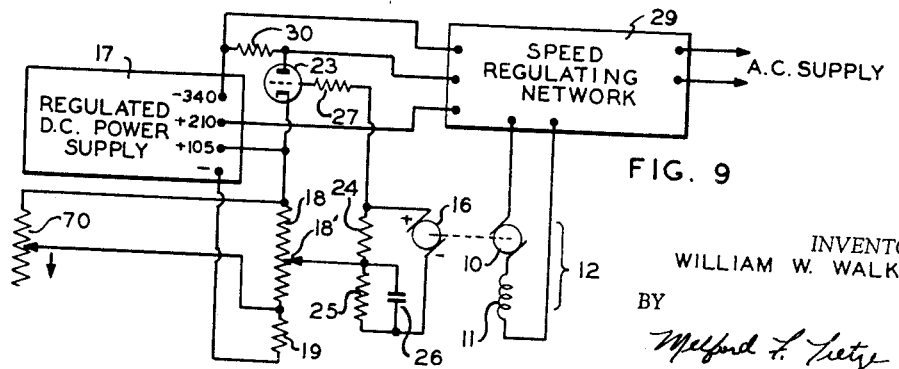

3,142,747
ELECTRIC ARC WELDING
William W. Walker, Franklin Park, N.J., assignor to Air Reduction Company, Incorporated, New York, N.Y., a corporation of New York
Filed Apr. 17, 1961, Ser. No. 103,481
10 Claims. (Cl. 219—137)

The invention relates to electric arc welding, and more particularly to electric arc welding carried out in accordance with the basic process disclosed in U.S. Patent No. 2,886,696 granted, on application of Roger W. Tuthill and Alanson U. Welch, to the assignee of the present invention. That process is now widely known as the "dip-transfer" process, and that designation is accordingly used herein.

In that process an electrode is fed toward the work at such a speed and with such an electrode-to-work voltage impressed through such an effective inductance that the electrode makes repetitive arc-short-circuiting contacts with the weld pool on the work, and an arc between the electrode and the weld pool occurs only in the time intervals between such contacts. The process has among others the advantage, pointed out in that patent, that the weld pool (i.e., the pool of molten metal existing at and adjacent the work extremity of the arc) may be maintained at a temperature which, though of course above the melting point, is substantially below the boiling point—with the result that the weld pool is less likely to run out under the influence of unfavorable orientations, from the position at which it has been generated and at which it should at least approximately remain to cool and solidify.

While that process is very successfully practiced in a wide variety of environments, there remain some applications—including, ironically, one or more in which the minimization of weld-pool run-out basically afforded by the process would be of especial value—wherein there arise various special problems which have hitherto somewhat impeded or even almost frustrated the satisfactory use of the process. The welding of heavy steel pipe "in situ" is, for example, one of these applications.

One of the problems arising in the applications referred to in the preceding paragraph is a strong tendency to the presence of "cold shuts" in the weld at various points along the welded seam where the welding operation has been carried on by the dip-transfer process over any form of local diminution of the root opening between the two members which have been welded—examples of such local diminutions being a "tack" weld preliminarily formed between the members to hold them in proper mutual relationship during the main welding operation; the end of a main weld previously made along a longitudinal portion only of the original inter-member groove; a local irregularity in either or both of the members itself serving to diminish the width of the groove, and the like. The cold shuts which tend to be formed in welding by the dip-transfer process over such diminutions are surfaces (not necessarily, and usually not, plane) traversing or partially traversing the welded seam, across which surfaces the weld metal has not been fused, or at least not thoroughly fused, and which therefore occasion structural weakness and/or perviousness.

It is an object of my invention to provide a method of control of dip-transfer arc welding by which there may readily be foreclosed the development of cold shuts under such circumstances as discussed in the preceding paragraph.

Another of the problems arising in such applications of dip-transfer welding as have been referred to above is posed by the variation in run-off tendencies of the weld pool as between portions of the groove whose orientations differ widely—for example, from an orientation approaching flat (i.e., approaching horizontal with the groove beneath the immediate welding apparatus) to an orientation approaching overhead. While it is implicitly true that with the dip-transfer process the entire array of welding parameters (i.e., voltage, current, inductance, arc length, travel speed along the groove, etc. as well as feed speed) may readily be chosen to minimize or wholly to avoid weld-pool run-out in the worst (i.e., near-overhead) orientation of the groove, it is unfortunately also true that this same so-chosen array of conditions, although entirely satisfactorily usable in the more favorable orientations, will involve a there-otherwise-unnecessary slowness and thus inefficiency of the welding operation—and human nature provides the rest of the problem.

It is an object of my invention to provide a method of dip-transfer arc welding permitting efficient operation and wholly satisfactory welding in various portions of the groove whose orientations differ widely, while still minimizing or foreclosing weld-pool run-out in the less favorably oriented portions.

It is a general object to provide simple, easily practised and reliable improvements in the dip-transfer process of arc welding.

It is a further general object to provide improvements in the apparatus used for dip-transfer arc welding facilitating the practise of the process improvements mentioned above.

It is a further specific object to provide means adapted for instinctive quick mastery by the operator by which he can carry out those process improvements with a minimum of conscious effort.

Other and allied objects will appear from the detailed description of my invention hereinafter set forth and from the appended claims.

It is known (see the abovementioned patent, column 12, lines 2–7) that the dip-transfer process of welding is operable at different rates of electrode feed. It does not appear to be understood, however, what the effects of feed-speed variations only—i.e., with all other parameters fixed—with that process would be. True, it might be expected by analogy to other processes of metal arc welding with automatically fed electrodes that one result of an increase of feed speed would be greater arc current (accompanied by at least a slight reduction of arc length), and vice versa. On the other hand it might be expected from extrapolation of the teachings of the abovementioned patent that another result of an increase of feed speed would be an increase of the percentage of each cycle of open- and short-circuiting occupied by the short-circuited condition (a result also quite consistent with the one parenthetically mentioned in the preceding sentence), and vice versa. Thus as a result of feed-speed increase only one would expect both increased current and a decreased ratio of the aggregate of the time intervals during which an arc actually takes place to total time, and as results of a feed-speed decrease both decreased current and an increased such ratio.

It is of course only while the arc actually takes place that significant heating is being contributed to the immediate region of the work—for during short-circuit intervals the pure-current-generated heat, dividing on a simple resistance basis, will appear principally in the electrode and will be distributed over its length all the way back to its contact with the current-supplying means. Thus the logical conclusion of the preceding paragraph, restated in terms of heating of the immediate region of the work, is that with feed-speed increase the reduction of such heating occasioned by the reduced ratio of arcing to total time would substantially offset the increase of such heating occasioned by the current increase—and that with feed-speed decrease the increase of such heating occasioned by the increased ratio would offset the reduction occasioned by the current decrease. In short, there would be expected little influence of feed-speed variation on heating in the immediate vicinity of the work, and thus on the root penetration of the weld.

Contrary to these expectations, I have discovered that in the dip-transfer process, specifically that process used with the preferred reverse polarity, a simple increase of electrode-feed speed—i.e., an increase thereof effected without change of any other parameter—is accompanied by a very striking increase in root penetration, and vice versa. I do not profess to know why this phenomenon, in apparent contradiction to ordinary expectations, occurs; I have, however, been able to put it to very beneficial uses.

One of these uses is the foreclosure of the formation of cold shuts at local diminutions of the root opening. According to my invention these are avoided by there temporarily substantially increasing the rate of feed of the electrode, preferably with no other change of parameters, thereby increasing the root penetration more than enough to engulf in the weld pool the extra material—of whatever history—which has occasioned the diminution.

Another of these uses is the increase of speed and thus of efficiency of the welding in portions of the groove whose orientations are relatively more favorable; I have observed that by there increasing penetration as contributed to by electrode-feed speed and on the other hand decreasing it as contributed to by length of time during which each sequential small section of the groove is subjected to the action of the welding arc, the same net penetration is achieved—not only with the obviously entailed and desirable faster travel, but also with a higher weld-pool surface temperature (which is there quite permissible in view of the relatively favorable orientation)— this too being a phenomenon the exact reasons for which I do not profess to understand. Stated reversely, the welding according to this aspect of my invention is carried on in the more favorably oriented portions of the groove with a fast travel and a relatively fast feed correlated to achieve a desirable penetration with a weld-pool surface temperature higher than would be permissible in the less favorably oriented portions—and in those less favorably oriented portions is carried on with a slower travel and slower speed, achieving the same penetration with a weld-spool surface temperature sufficiently low to minimize or foreclose run-off.

These uses are of exceptional advantage in the application of the dip-transfer process to pipe welding. This is an application of that process hitherto too little used, because as hitherto attempted it has been found to entail the disadvantage either of excessive proclivity to cold shuts, or of requirement for exceptionally slow and skillful welding manipulations, or both—which disadvantages are quite dispelled by the use of my invention. Accordingly I herein disclose my invention in terms of its application to pipe welding; I do not, however, thereby intend any unnecessary limitations.

In the detailed description of my invention hereinafter set forth reference is made to the accompanying drawing, wherein:

FIGURE 1 is a cross-sectional view taken through the central plane of a portion of the groove formed between two pipes which are to be joined by welding, prior to the main welding of those pipes;

FIGURES 2 through 5 are cross-sectional views taken along the lines 2—2, 3—3, 4—4 and 5—5 respectively of FIGURE 1;

FIGURE 6 is a view similar to FIGURE 1 but taken after the root-pass welding of the pipes through the length of the groove shown in that figure;

FIGURE 7 is a view similar to FIGURE 1 taken through the central plane of a different portion of the same groove;

FIGURE 8a is a fragmentary view taken through the inter-pipe groove after the second-pass welding of the pipes;

FIGURE 8b is a similar view taken after the third-pass welding;

FIGURE 9 is a schematic circuit diagram of a typical electrode-feed-rate controlling system which may be used in the practice of the invention;

FIGURE 10 is an elevational view, with certain external parts broken away, illustrating a typical welding gun according to the invention, and showing schematically the associated wire feeder;

FIGURE 11 is a horizontal cross-sectional view taken along the line 11—11 of FIGURE 10;

FIGURE 12 is a vertical cross-sectional view taken along the line 12—12 of FIGURE 11;

FIGURE 13 is a view similar to FIGURE 12 but illustrating the positions of the components when the tigger 69 has been displaced slightly rearwardly;

FIGURE 14 is a vertical cross-sectional view taken along the line 14—14 of FIGURE 11; and FIGURE 15 is a graph by reference to which the making of the root-pass weld between the pipes is hereinafter described.

Reference being made to FIGURES 1 through 5, there will be seen fractionally the end of a pipe 1 which is to be joined to the end of a similar pipe 2 coaxial therewith and in close spaced relation thereto. Typically the end of each pipe will have been bevelled, for example at an angle of about 30 degrees from normal to the axis of the pipe, and the inter-pipe space will be in the form of an annular V-shaped groove 3 with a small apical or root opening 4 at the inner limit of the pipe thickness. The two pipes may be assumed to be already held in some manner in aligned and substantially horizontal position, as by tack welds made therebetween at a plurality of spots around the groove, such a tack weld appearing in cross-section as 5 in FIGURES 1 and 3.

In welding the pipes 1 and 2 together there may typically be made three successive passes; of these the first and most critical may be termed the root pass, in which metal, thoroughly fused to the walls of the groove, is deposited in the groove to a depth typically of a little over a third of the pipe-wall thickness. For making these successive passes there may be employed a suitable welding gun. Certain novel particular features of the gun which I prefer to use are described hereinafter, but at this point it is sufficient to say that the gun may be of the general type shown in FIGURE 4 of U.S. Patent No. 2,719,245 issued on application of Nelson E. Anderson to the assignee of the present invention, to which a consumable electrode wire is pushed by a suitable wire feeder located near but not at the gun. With the gun there will be employed a suitable source of welding current, preferably having a constant or even more preferably a rising voltage-current characteristic, preferably used at reverse polarity (i.e., electrode positive), and having inductance and other parameters suitable for the dip-transfer welding disclosed in the above-mentioned Patent No. 2,886,696. A shielding gas, preferably at least largely $CO_2$, will be supplied to the gun and by it discharged about the electrode as the latter is fed to the weld.

In making the root pass in the section of the pipe illustrated in FIGURE 1 it may be assumed that the dip-transfer welding has been started outside the upper left limit of the figure, and is being carried on in a clockwise direction. The axis of the gun and of the wire electrode is preferably being maintained at a "backhand" angle from the radius of the pipe (i.e., the wire electrode is less advanced in the arcuate direction of travel than the remainder of the gun) of the order of 50°, as indicated by the dash-dot line *a* in FIGURE 1, and the usual techniques of dip-transfer welding are being followed—very desirably including the maintenance of a "keyhole," or melted-away area in the edges of the root opening, just in advance of (e.g., in FIGURE 1, in a slightly more clockwise position than) the weld pool (i.e., the pool of molten metal formed in the groove by the welding). The rate of feed of the electrode is being maintained at a value suitable to and very substantially less than the upper limit for dip-transfer welding.

As the travel of the electrode and thus of the weld pool along the groove progresses the electrode will approach—e.g., come to a position ⅛" or so away from— the tack weld 5, the axis of the electrode then being typically in the position indicated by line *b*. In accordance with my invention the rate of feed of the electrode is temporarily increased substantially while the electrode is passing over the tack weld. Preferably this speed increase will be accompanied by a reorientation of the angle of the electrode axis to a "forehand" one of the order of 15° to 20° from the pipe radius, as indicated by the line *c* in FIGURE 1, accomplished by smoothly rotating the gun, about the electrode tip as a center, from the backhand to the forehand orientation simultaneously with the increase of feed rate. When the electrode has travelled over the tack weld—e.g., to a position ⅛" or so beyond it, as indicated by the line *d* in FIGURE 1—the rate of feed of the electrode is reduced to its original value and the electrode axis is smoothly rotated back to the original backhand angle, as indicated by line *e*.

As indicated introductorily above, the result of the feed-rate increase is a marked increase of root penetration, ample to engulf the tack weld and melt it into the weld pool and thus to foreclose the development of the otherwise likely cold shut. The current of course is increased, but the expectable annulment of the effect of that increase by an attendant decrease of the ratio of arcing to total time simply does not occur. The change of angle is an aid to the action, in that it insures thorough access of the arc to the first-encountered edge of the tack weld, but is something which if effected without the feed-rate increase would by no means suffice to produce the result of proper engulfment.

As hereinabove indicated, the tack weld is one form of local diminution of the root opening, but it is by no means the only form which may be coped with by the practice of my invention. Thus, for example, the bevelling of the ends of the pipes may suffer from local irregularities, some of which may for example serve locally to reduce the root opening below the normal otherwise established; FIGURES 1 and 4 illustrate a protuberance 6 from the pipe 1 constituting such an irregularity. According to the invention a technique quite similar to that above described will be used in the travel of the electrode over the protuberance 6—i.e., when the electrode reaches a position such as indicated by line *f* it will be rotated to an orientation such as indicated by line *g* and the feed rate will be increased, and that altered orientation and increased rate maintained during the travel of the electrode to the position approximately indicated by line *h*, whereupon the electrode will be rotated to the original orientation (indicated by line *i*) and the feed rate reduced to the original value—and again the development of a cold shut is foreclosed.

The tack weld may be considered a total, and the protuberance 6 a limited, form of diminution of the root opening. Still another form of diminution of that opening—like the tack weld, a total one—will be occasioned by the end portion of a root-pass weld previously made in a portion of the groove at which the portion being welded terminates, as indicated by the weld 8 of which the upper end portion appears in FIGURE 1 and which is seen in cross-section in FIGURE 5. According to the invention there will again be used a technique basically similar to that above described—i.e., when the electrode reaches a position such as indicated by line *j* it will be rotated to an orientation such as indicated by line *k* and the feed rate will be increased, and that altered orientation and increased rate maintained during the travel of the electrode over the end portion of the weld 8 to a position such as indicated by line *m* where the previously made weld is of full depth—thereby thoroughly "tying in" the weld being made to that previously-made weld, and again very effectively foreclosing the development of a cold shut. In this case, since the previously made weld 8 obviates the necessity for continuance, there is no need for reorientation of angle and reduction of current to former values; the current will simply be terminated and the welding stopped.

FIGURE 6 illustrates in cross-section the weld 9 made in accordance with the foregoing and merging without discontinuity into the previously made weld 8. In the weld 9 there will be slight increases in depth as indicated at 5', 6' and 8', resulting from the deposition of additional electrode material incident to the increases of feed rate at the diminutions 5, 6 and 8 respectively; these are unharmful, and may be readily compensated for in the second-pass welding which will be carried out after the root pass has been completed throughout the entire groove.

Broadly the tack welds (e.g. 5) and the protruberances (e.g. 6) and the end portion of a previously made weld (such as 8), as well as the local slight "mounds" 5', 6' and 8' characterizing the weld 9 as just mentioned, are regions whereat the groove cross section presents the need for increased weld penetration, which increased penetration I provide by temporary increases of the electrode feed rate; in other terms, I alter that rate from region to region along the groove in direct (as distinguished from inverse) relationship to the needs for weld penetration there presented.

FIGURE 1 has illustrated an arcuate length of the groove having an orientation lying between flat and vertical and therefore relatively favorable in that the tendencies toward run-off of the weld pool are limited; therein the normal rate of feed of the electrode may be substantial, permitting proper penetration with favorably fast rates of travel along the groove on the other hand. FIGURE 7 illustrates an arcuate length of the groove having an orientation lying between vertical and overhead, and therefore relatively unfavorable in that there will be greater tendencies toward run-off of the pool. I cope with these tendencies by employing through such a length of the groove a somewhat reduced normal rate of feed of the electrode—but achieving the same penetration by substantially slowing the speed of travel of the electrode along the groove. The combination of somewhat reduced feed rate and substantially reduced travel speed appears to achieve the same net penetration with a lower surface temperature of the weld pool, and therefore lower propensity to run-off. It is to be understood, however, that the changes in normal feed rate and travel speed in no way foreclose the use of the features of my invention above described for avoiding the development of cold shuts at local diminutions of the root opening, such as end portion 38 of a previously-made root-pass weld or as the tack weld 35 between the pipes, both of which are shown in FIGURE 7.

While in the more favorably oriented portions of the groove I prefer to weld in a downhill direction, I prefer for the less favorably oriented portions (such as that of FIGURE 7) an uphill direction. While for the normal travel (i.e., travel between local diminutions) within the more favorably oriented portions there is preferred a steady backhand angle of electrode axis to pipe radius, there is preferred within the less favorably oriented portions an angle progressively changing from backhand at the most unfavorable part of the groove to a forehand angle at the least unfavorable part—the former, however, subject to temporary change to forehand in travelling over local discontinuities.

Thus in welding in the portion of the groove shown in FIGURE 7 I may start with the electrode at the position and with the forehand orientation (of 15° to 20°) indicated by the line $n$—which is the most unfavorably oriented part of this portion of the groove—and may cause the electrode to travel over the previous-weld end portion 38 while temporarily maintaining a higher rate of electrode feed than that which will be normal for this portion of the groove. When the electrode has passed to just beyond that end portion 38 (e.g. to the position indicated by line $o$) the feed rate will be reduced to that normal, and the electrode will be rotated to the backhand orientation—for example, of about 50° angle to the pipe radius—indicated by the line $p$. As the travel of the electrode progresses the backhand orientation may be progressively reduced, until at an intermediate point in this portion of the groove (typically, one from which a line to the pipe axis would be inclined at about 45° to the vertical) the orientation of the electrode is radial, as indicated by the line $u$. As the travel of the electrode progresses still further the orientation may become increasingly forehand, as indicated by the line $v$. When in this progress the electrode approaches the local diminution caused by the tack weld 35 (e.g., reaches the position indicated by line $q$) the electrode feed rate will be increased and the electrode (unless already in a suitable forehand orientation) rotated to bring it into the somewhat forehand orientation indicated by line $r$; the increased feed rate and forehand orientation will be maintained while the electrode travels over the tack weld (e.g. to the position indicated by line $s$), whereupon the feed rate will be reduced to the normal for this portion of the groove and the electrode reoriented back to the orientation (indicated by line $t$) which it would have occupied had the tack weld not been encountered.

The apt practise of the foregoing methods of penetration control in dip-transfer welding may be tremendously facilitated by (a) an electrode feeding means of controllable rate which essentially instantly and solely responds to the means provided for controlling its rate and is essentially impervious to varying friction and to other factors which may vary in random and unpredictable manner, and (b) a feed-rate control means which not only is available to the welding operator at the gun (as is for example the knob 187 in FIGURE 4 of the above-mentioned non-dip-transfer Anderson patent) but which also are arranged to be used essentially instinctively, or with practically no conscious effort by the welding operator.

To meet specification (a) I have advantageously utilized a feed-control system of the type disclosed in U.S. Pat. No. 2,870,391 issued, on application of Rawlins E. Purkhiser, to the assignee of the present invention. Such a system is shown in FIGURE 9. In general outline, the armature 10 of the A.C. motor 12 which drives the wire is mechanically coupled to a tachometer generator 16 which generates a D.C. voltage directly proportional to motor speed, and this generated voltage is compared with a reference voltage. So long as the difference between the two is precisely of a particular value predetermined by the constants of the system, the motor speed remains unaffected; as soon as it differs in either sense from that particular predetermined value, however, it is utilized forthwith to increase or decrease (as the case may be) the motor speed so as to restore it to that predetermined value. The adjustable control element adjusts the reference voltage, and thus the motor speed at which the generated voltage will differ from the reference voltage by the predetermined value.

More specifically, the output of the generator 16 is impressed across the serially arranged resistors 24 and 25 (the latter shunted by capacitor 26 for reasons set forth in the Purkhiser patent), and the drop across the resistor 24 constitutes the generated voltage. A moderate-voltage output of a regulated D.C. supply 17 is impressed across serially arranged resistances comprising that of a potentiometer 18—modified by the resistance of an element, later described, in parallel with it—and that of a resistor 19, and the drop across the portion of the potentiometer lying between its movable contact 18' and its upper-shown extremity constitutes the reference voltage; this reference voltage is of course under the control not only of the contact 18' but also of the value of any element in parallel with the potentiometer. The differential between the generated and reference voltages is impressed between the grid and the cathode of a vacuum-tube triode 23, through a series resistor 27, the cathode of the triode being connected to the positive terminal of the moderate-voltage output. The output of the triode, developed across the resistor 30 interposed between its anode and the full-voltage output of the D.C. supply 17, is impressed on the input of a speed-regulating network 29 whose details are disclosed in the Purkhiser patent. It is here sufficient simply to say that the network operates by utilizing the voltage impressed on the grid of the triode to establish the degree of saturation of the core of a reactor, that degree of saturation in turn establishing the phase of an A.C. voltage applied to the grid of a thyratron tube whose anode circuit is connected in series with the armature 10 and field 11 of the motor 12, and that phase in turn establishing the percentage of each cycle of the A.C. motor supply during which the thyratron will be conductive and thus the torque and speed of the motor—to which last the generated voltage (across resistor 24) was above noted to be proportional. The network may be so arranged that an increase of the reference voltage (i.e., that between contact 18' and the upper-shown extremity of potentiometer 18), tending to make the triode grid more negative, will increase the speed of the motor 12 and thus the rate of electrode feed, and vice versa. The entire feed-control system thus described (other than for an element connected in parallel with the potentiometer 18 and hereinafter mentioned) may if desired be physically located in the wire feeder.

In connection with specification (b) above-mentioned I have observed that on a welding gun the one control member of which the manipulation by the operator meets this specification is the normally-provided trigger by which the gun is placed in and out of operation. I take advantage of this by suitably associating the electrode-feed rate-controlling means with that trigger. This I have illustrated in FIGURES 10 through 14, of which FIGURE 10 comprises an elevational view of the welding gun 40 and a purely schematic showing of a wire feeder—suitable cables 81, 82 and 83 between gun and feeder serving to feed to the gun the wire electrode and shielding gas and to make between the two units the necessary electrical connections. The gun 40 of course comprises the casing 41; the nozzle 42 extending forwardly from the casing and from which there is fed forwardly the electrode 39 and a surrounding flow of shielding gas; and a hollow handle or grip 43 extending downwardly from the casing and being for example of molded material and secured to the casing by any convenient means which may for example include screw 45. The trigger above referred to appears as 60, extending from within the casing forwardly through an aperture 44 in the casing and being adapted to be displaced rearwardly by pressure exerted on it by a finger of the hand which grips the handle 43.

To support the trigger and immediately associated components a bracket 46, J-shaped in plan view (see FIGURE 11), may be secured in the upper portion of this handle 43 by any convenient means (not shown), with the long arm of the J forwardly directed. From the forward portion of this arm there may extend rightwardly a stud 49, about which near its free extremity may be fitted a retaining C-ring 50; immediately to the left of the C-ring a spacing washer 51 may encircle the stud. To the left of the washer 51 there may be pivotally assembled on the stud the upper end portion of a channel member 52 which is open to the front and the two side portions of which are suitably apertured to fit over the stud, and immediately to the left of the channel member the stud may be encircled by another spacing washer 53. To the left of the washer 53 there may be pivotally assembled on the stud 49 the hub of a sector gear 54 which from that hub extends rearwardly to within the fold of the J-shaped bracket 46; this gear may be secured to the central portion of the channel member 52, so that the two pivot together about the stud, by a small bracket 56 secured therebetween. Between the hub of the sector gear and the J-shaped bracket 46 another spacing washer 57 may encircle the stud. A lug 47 may extend downwardly from the J-shaped bracket 46 and be folded leftwardly to form a foot 48 acting as a stop for downward movement of the sector gear, and the sector gear may be biased against that stop by any convenient means such as a coil spring 58 extending from a pin 55 on the sector gear down to that foot 48—this serving to establish a normal angular position for the channel member 52 about the stud 49.

The trigger 60 may be a molded generally hollow piece, formed with a centrally apertured but otherwise solid upper portion 61 pivotally assembled on the stud 49 within the side portions of the channel member 52. From the upper portion 61 the trigger may extend a short distance downwardly in front of the channel member and may then be widened and provided with side portions 62 which with the front and bottom of the trigger are in generally surrounding relationship to the forward portion of the channel member 52. The usual function of the trigger 60, when pressed reasonably by the finger, is the closing of an on-off switch by which the wire feeder 80 is placed in operation, and the apparatus is arranged so that this function is performed while the channel member remains in its normal position above mentioned. To this end a miniature encased switch 69 may be secured within the channel member near its lower extremity (the central portion of that member being there cut out to provide access to the switch lugs), and a suitably folded leaf spring 68 may be secured to the switch so that pressure on the lower extremity of that spring will close the switch. Such pressure may be applied, when the trigger is moved rearwardly, by a small boss 63 extending inwardly from the central portion of the trigger. Normally the trigger may rotate, relative to the channel member, sufficiently so that the boss 63 does not apply such pressure—a limit to this rotation of the trigger being for example provided by a screw 59 adjustably threaded through the upper portion of the channel member 52 to be impinged on by an upwardly extending ear 64 at the top of the trigger—and is biased thus to rotate by a light helical spring 65 compressed between trigger and channel member and disposed about a post 66 secured to the latter near its bottom (see FIGURE 12). A small rearward displacement of the trigger against its bias, however, will serve to compress the spring 65 and to bring the trigger into impingement against the forward end of the post 66 (see FIGURE 13), in which action pressure will be applied to the leaf spring 68 to close switch 69 and thus to place the wire feeder 80 in operation.

With the trigger arrangement thus described I associate in very simple manner a means for controlling the rate of electrode feed. This means may be a small rheostat 70 (see FIGURE 11) mounted on the smaller arm of the J-shaped bracket 46 with its shaft extending horizontally into the space within the fold of the J; in this space there may be secured on that shaft the small pinion gear 71, which is engaged by the sector gear 54. The rheostat may be adjusted to have a suitable predetermined minimum value of resistance when the trigger has been displaced rearwardly just sufficiently to close the switch 69 but the channel member 52 still occupies its normal (e.g., FIGURE 13) position. The trigger may, however, be displaced further rearwardly, carrying with it (in view of post 66) the channel member and sector gear—and thus rotating the shaft, and increasing the resistance, of the rheostat 70. This rheostat may be electrically connected in parallel with the potentiometer 18 (see FIGURE 9), and the increasing of its resistance will therefore increase the voltage drops across the entire potentiometer and between its movable contract 18′ and its upper—shown extremity—i.e., will increase the reference voltage mentioned above and thus the rate of electrode feed. Conversely, a release of the trigger from its rearward displacement will first reduce the resistance of the rheostat and thus the rate of electrode feed until there are again reached the predetermined minimum resistance of the rheostat and the rate of electrode feed corresponding to that minimum, after which the final release of the trigger will cause the switch 69 to be thrown to off position and the wire feeder 80 to cease operating.

Increase of electrode feeding rate thus requires simply an extension of the act—rearward trigger displacement—which is required to cause the electrode to feed at all; conversely decrease of that rate requires simply a preliminary performance of the act—trigger release—which is ultimately required to cause the electrode to stop feeding altogether. This results in an almost immediate and instinctive mastery by the operator of the manipulation required for feeding-rate control, and enables him thereafter to effect such control with essentially no conscious effort, with no appreciable time lag between desire for and accomplishment of a rate change, and of course with no need to use any hand or fingers not already involved in holding the gun and keeping the trigger-switch 69 closed. It will therefore be appreciated that such steps as I have disclosed hereinabove for coping with local diminutions of the root opening as well as for altering the normal feed rate as between different portions of the groove, while not limited to practice with any particular apparatus, may nevertheless be greatly facilitated by the use of the particularly disclosed gun or its equivalent.

In FIGURE 15 I show a graph illustrating a preferred procedure for making the root-pass weld between two pipes such as 1 and 2 of the initial figures. This graph is plotted against polar coordinates, of which the unnumbered arcuate abscissae represent simply circumferential position in the groove and may therefore be referred to in "o'clock" terms, and of which the radial ordinates represent welding current in amperes and are therefore among other things an indication of rate of electrode feed. Elapsed actual welding time at various points along the groove is indicated, at 10-second intervals, by the small numerals disposed along the graph; it will be appreciated that the presence of such numerals relatively close together indicates relatively slow travel, and their presence relatively far apart indicates relatively fast travel, along the groove.

I prefer to start the root-pass weld at the 6-o'clock position and to carry it uphill through an adjacent quadrant—for example to the 3-o'clock position—using as normal for the quadrant a moderate rate of feed, resulting for example in a current of the order of 75 amperes, and a relatively slow travel. The welding in this quadrant may be carried out in general accordance with the description presented above with respect to FIGURE 7 (excepting that there will be no initial increase of current, since there will have been no previous root-pass weld). In this quadrant (as well as in the others to be described below) the current may be substantially increased above normal in passing over such local diminutions of the root opening as tack welds or protruberances, though for simplicity of the showing FIGURE 15 does not indicate any increases of that character.

I may next make the root-pass weld in the opposite quadrant, starting at the 12-o'clock position and progressing downhill to about the 9:30-o'clock position—using as normal for this quadrant a materially higher rate of feed, resulting for example in a current of the order of 100 amperes, and a relatively fast travel. The welding in this quadrant may be carried out in general accordance with the description presented above with respect to FIGURE 1 (excepting, of course, that there is presumably no terminal root-opening diminution to be coped with).

I may next make the root-pass weld in the quadrant between the 12-o'clock and 3-o'clock positions, starting at the former and progressing downhill to the latter—using as normal for this quadrant a rate of feed and a speed of travel of the same order as those for the quadrant last described. Because of the diminution presented in the 12-o'clock region by the previously made root-pass weld, the inception of the root-pass under discussion is effected with a temporarily increased feed rate, indicated in FIGURE 15 by the current peak approaching 150 amperes; following that inception it may be carried out in general accordance with the description presented above with respect to FIGURE 1, the terminal temporary feed-rate increase mentioned in that description being indicated by the 3-o'clock current peak.

I may next make the root-pass weld in the opposite quadrant, starting at the 6-o'clock position and progressing uphill to about the 8:30-o'clock position—using as normal for the quadrant a rate of feed and a speed of travel of the same general order as those for the quadrant between the 6- and 3-o'clock positions. The welding in this quadrant may be carried out in general accordance with the description presented above with respect to FIGURE 7, the initial temporary feed-rate increase mentioned in that description being indicated by the 6-o'clock current peak.

There is obviously left unwelded the short arcuate portion of the groove between the 9:30- and 8:30-o'clock positions and I may complete the root-pass by welding in this portion, starting at the former and progressing downhill to the latter position. In this portion the feed rate and travel speed may be of the same general order as those for the two upper quadrants, and the welding may be carried out in general as in those quadrants—of course with both initial and terminal temporary increases of feed rate, indicated by the current peaks at the 9:30- and 8:30-o'clock positions, called for by the diminutions presented by previously-effected root-pass welding at both of those positions.

It is particularly to be noted, although it has not been specifically illustrated in the graph of FIGURE 15, that the existence of previously made tack welds (as well as other local diminutions of the root opening) is readily accommodated to, in the manner described in connection with the early figures herein, without loss of welding time. Thus this root-pass welding procedure is inherently adapted to the welding of pipes which are positioned relative to each other by the simple expedient of tack welding, and with which the use of troublesome internal mandrels or elaborate external pipe-aligning means is therefore quite unnecessary.

The root-pass weld being thus completed, the second-pass welding may be effected. Preferably this will be done in two semi-circular uphill trips, each from the 6-o'clock to the 12-o'clock position. Because of the greater width of the groove in the depth range being dealth with in this pass, the electrode tip and arc will be subjected to oscillation from side to side during the travel along the groove, in accordance with well-understood practice—that oscillation being preferably a U-shaped one, with slight pauses at each peak. FIGURE 8a illustrates fractionally the typical cross-section of the groove after the second-pass welding.

Finally the third-pass welding may be effected. Again this will preferably be done in two semi-circular uphill trips, each from the 6-o'clock to the 12-o'clock position. Again the electrode tip and arc will be subjected to oscillation from side to side during the travel—that oscillation in this case being preferably a "lazy-8" weave with slight pauses at the peaks. FIGURE 8b illustrates fractionally the typical cross-section of the groove after the third-pass, or final, welding.

In making each of the four 180° trips involved in the second- and third-pass welds (considered collectively) the successive electrode orientations as disclosed in connection with FIGURE 7 may advantageously be employed in the first of the two quadrants, and a steady backhand orientation of very approximately 50° angle to the pipe radius throughout the second quadrant, covered by the trip. The rate of electrode feed may advantageously be progressively varied from relatively low at and near the 6-o'clock position to relatively high at and near the 12-o'clock position.

It will of course be understood that the overall pipe-welding procedure thus described with particular reference to FIGURES 15 and 8a and 8b may be rather widely varied while still not departing from the practice of the invention in one or several of the subdivisional aspects of that procedure.

It will be appreciated that in any such procedure the extremely facile, effortless and instantaneous control over electrode-feed rate provided by such a gun as above described is of tremendous value, in coping both with local diminutions of the root opening and with the different welding conditions respectively presented by the more and less favorably oriented portions of the groove. The advantages of that control are not, however, limited to these beneficial uses, but extend to others as well. By way simply of one example, it may be mentioned that when starting a root-pass weld in a part of the groove where no previous weld exists a temporarily lower-than normal electrode-feed rate is usually very advantageous in forming the initial "bridge" over the root opening—and is very simply provided by there releasing the gun trigger toward, though of course not fully to, the switch-opening position. A similar technique may be used at abnormal local enlargements of the root opening. To preserve the opportunity to gain in full measure the advantages of such uses, it is desirable to arrange the resistance values of the rheostat 70, and of the potentiometer 18 and resistors and other parameters in the speed-controlling system (e.g., that of FIGURE 10), so that a reasonably wide range of rate control is achieved—for example, one which will be attended by current change from the order of approximately 60 to the order of approximately 150 amperes.

The particular examples of a pipe-welding procedure which has been disclosed above is one which was carried out, with the dip-transfer process, on 8" mild-steel pipe with a mild-steel wire electrode of .035" diameter, using at reverse polarity a current source having a rising volt-ampere characteristic, and supplying to the arc environs a shielding gas consisting of 20% argon and 80% carbon dioxide—and under the unfavorable influence of a wind of 15 miles per hour artificially blown across the arc during the welding in order to simulate adverse field conditions. Automatically recorded observations made of the time consumed in actual welding showed that the root-pass weld consumed 313 seconds, while all three passes collectively consumed 1123 seconds. (This compares with approximately 750 seconds consumed in actual welding of a similar joint by skilled workmen using the simple "stick-electrode" welding technique, which however required preliminary cleaning and chipping operations on the groove themselves consuming 570 seconds—preparatory operations for which the need is wholly absent in the use of the dip-transfer process in accordance with my invention.) The resulting inter-pipe weld complied with and successfully passed the tests called for in the extremely rigid ASME Code for Unfired Pressure Vessels.

I have also successfully applied the same basic procedure to the welding of such alloy-steel pipes as those containing approximately 5% chrome and 0.5% molybdenum. Pipes of such material ordinarily called for both pre-heating and post-heating operations in order to prevent cracking in and adjacent to the weld. I have found, however, that dip-transfer welding carried out in the procedure according to my invention wholly obviates the need for the pre-heating, and results in perfect and relatively rapidly made welds of such pipes.

In connection with the particular root-pass procedure illustrated in and described in connection with FIGURE 15, it may be pointed out that in the lower portions of the groove the uphill directions of the welding not only aids the other steps above explained in foreclosing runout of the weld pool, but also in providing the maximum assurance of good welding in this inherently unfavorably oriented portion while in the upper portions of the groove the downhill direction of the welding permits not only the achievement of maximum speed but also minimum reliance on operator skill. The leaving until last of the 9:30- to 8:30-o'clock portion has the advantage of enabling the root-pass to be completed by a short and downhill trip in a position ordinarily of maximum visibility. The alternated distribution of portions in the sequence has the advantage of avoiding excessive contrasts in the temperatures around the pipes. Finally, these various advantages are secured without any noticeable cost of tie-in difficulties, which are nicely and effortlessly dispelled by the temporary-rate-increase technique described above.

While I have disclosed my invention in terms of particular methods and particular structures, it will be understood that I thereby intend no unnecessary limitations. Modifications in many respects will be suggested by my disclosure to those skilled in the art, and such modifications will not necessarily constitute departures from the spirit or scope of the invention, which I undertake to define in the following claims.

I claim:

1. The method of arc welding work comprising a pair of members along a groove therebetween whose root opening is characterized by at least one local diminution while maintaining proper root penetration of the weld throughout the groove, which comprises moving the extremity of an elongated consumable electrode along the groove while feeding the electrode to the work at rates within such a range, and with such inductively impressed voltage on the electrode relative to the work, that the electrode and a weld pool on the work make repetitive short-circuiting contacts with each other and an arc between the electrode and the work occurs only in the time intervals between such contacts, maintaining the rate of feed of the electrode when away from any such diminution at substantially less than the maximum of said range, and at said diminution temporarily increasing within said range the rate of feed of the electrode.

2. The method of arc welding work comprising a pair of members along a groove therebetween across which at least one tack weld has previously been made, which comprises moving the extremity of an elongated consumable electrode along the groove while feeding the electrode to the work at rates within such a range, and with such inductively impressed voltage on the electrode relative to the work, that the electrode and a weld pool on the work make repetitive short-circuiting contacts with each other and an arc between the electrode and the work occurs only in the time intervals between such contacts, and at said tack weld temporarily increasing within said range the rate of feed of the electrode.

3. The method of arc welding work comprising a pair of members along a groove therebetween in a second portion adjacent to a first in which a root-pass weld has previously been made, which comprises moving the extremity of an elongated consumable electrode along the groove while feeding the electrode to the work at rates within such a range, and with such inductively impressed voltage on the electrode relative to the work, that the electrode and a weld pool on the work make repetitive short-circuiting contacts with each other and an arc between the electrode and the work occurs only in the time intervals between such contacts, and temporarily increasing within said range the rate of feed of the electrode at the region of tie-in to said previously made weld.

4. The method of arc welding work comprising a pair of members along a groove therebetween whose root opening is characterized by variation along the groove, which comprises moving the extremity of an elongated consumable electrode along the groove while feeding the electrode to the work at rates within such a range, and with such inductively impressed voltage on the electrode relative to the work, that the electrode and a weld pool on the work make repetitive short-circuiting contacts with each other and an arc between the electrode and the work occurs only in the time intervals between such contacts, and altering the rate of feed of the electrode within said range in an inverse relationship to the magnitude of the root opening.

5. The method of arc welding work comprising a pair of members along a groove therebetween the orientations of different portions of which are respectively more and less favorable to the avoidance of run-out of a weld pool therefrom while minimizing such run-out at all portions of the groove, which comprises moving the extremity of an elongated consumable electrode along the groove while feeding the electrode to the work at rates within such a range, and with such inductively impressed voltage on the electrode relative to the work, that the electrode and a weld pool on the work make repetitive short-circuiting contacts with each other and an arc between the electrode and the work occurs only in the time intervals between such contacts, and increasing the rate of feed of the electrode to higher values within said range in the more favorably oriented relative to the less favorably oriented portions of the groove.

6. The method of arc welding work comprising a pair of members along a groove therebetween the orientations of different portions of which are respectively more and less favorable to the avoidance of run-out of a weld pool therefrom while minimizing such run-out at all portions of the groove, which comprises moving the extremity of an elongated consumable electrode along the groove while feeding the electrode to the work at rates within such a range, and with such inductively impressed voltage on the electrode relative to the work, that the electrode and a weld pool on the work make repetitive short-circuiting contacts with each other and an arc between the electrode and the work occurs only in the time intervals between such contacts, and increasing the rate of feed of the electrode to higher values within said range, while increasing the speed of travel of the electrode along the groove, in the more favorably oriented relative to the less favorably oriented portions of the groove.

7. The method of arc welding work comprising a pair of members along a groove therebetween along which groove there is at least one local region whereat the groove cross section presents the need for increased weld penetration, which comprises moving the extremity of an elongated consumable electrode along the groove while feeding the electrode to the work at rates within such a range, and with such inductively impressed voltage on the electrode relative to the work, that the electrode and a weld pool on the work make repetitive short-circuiting contacts with each other and an arc between the electrode and the work occurs only in the time intervals between such contacts, and at said local region temporarily increasing within said range the rate of feed of the electrode.

8. The method of arc welding work comprising a pair of members along a groove therebetween which at different regions therealong presents varying needs for weld penetration, which comprises moving the extremity of an elongated consumable electrode along the groove while feeding the electrode to the work at rates within such a range, and with such inductively impressed voltage on the electrode relative to the work, that the electrode and a weld pool on the work make repetitive short-circuiting contacts with each other and an arc between the electrode and the work occurs only in the time intervals between such contacts, and altering the rate of feed of the electrode within said range from region to region along the groove in direct relationship to the needs for welding penetration there presented.

9. In the arc welding of work comprising a pair of axially aligned substantially horizontal pipes along a groove between the pipe ends by the dip transfer process wherein an electrode is fed toward the work at rates within such a range, and with such inductively impressed voltage on the electrode relative to the work, that the electrode and a weld pool on the work make repetitive short-circuiting contacts with each other and an arc between the electrode and the work occurs only in the time intervals between such contacts, the method which comprises performing the root-pass welding in the lower portions of the groove in uphill directions at relatively lower rates of feed within said range and at a relatively lower speed of travel of the electrode, and performing the root-pass-welding in the upper portions of the groove in downhill directions at relatively higher rates of feed within said range and at a relatively higher speed of travel of the electrode.

10. The method claimed in claim 9, further comprising, in the root-pass welding of later-welded portions of the groove, the step of temporarily increasing within said range the rate of feed of the electrode at regions of tie-in to the root-pass welding of earlier-welded portions.

References Cited in the file of this patent
UNITED STATES PATENTS

| | | |
|---|---|---|
| 2,870,323 | Roper et al. | Jan. 20, 1959 |
| 2,873,355 | Schaefer et al. | Feb. 10, 1959 |
| 2,909,649 | Landis et al. | Oct. 20, 1959 |
| 2,931,890 | Bernard | Apr. 5, 1960 |